United States Patent
Zalzala et al.

(10) Patent No.: US 10,814,759 B2
(45) Date of Patent: Oct. 27, 2020

(54) TOP-LOADED SEAT CUSHION SYSTEM

(71) Applicant: Ford Global Technologies, LLC, Dearborn, MI (US)

(72) Inventors: Murtatha Zalzala, Dearborn, MI (US); Byron L. Brock, South Lyon, MI (US); Cesar Adrian Davila Garcia, Tlalnepantla (MX); Francisco Ronquillo, Puebla (MX); Arthur Beneventi, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 16/046,112

(22) Filed: Jul. 26, 2018

(65) Prior Publication Data
US 2020/0031261 A1 Jan. 30, 2020

(51) Int. Cl.
| | |
|---|---|
| *B60N 2/68* | (2006.01) |
| *B60N 2/58* | (2006.01) |
| *B29C 45/14* | (2006.01) |
| *B29K 705/12* | (2006.01) |
| *B29K 75/00* | (2006.01) |
| *B29K 105/04* | (2006.01) |
| *B29L 31/30* | (2006.01) |
| *B29L 31/00* | (2006.01) |

(52) U.S. Cl.
CPC ............ *B60N 2/686* (2013.01); *B60N 2/58* (2013.01); *B60N 2/682* (2013.01); *B29C 45/14549* (2013.01); *B29C 45/14819* (2013.01); *B29K 2075/00* (2013.01); *B29K 2105/04* (2013.01); *B29K 2705/12* (2013.01); *B29L 2031/3005* (2013.01); *B29L 2031/771* (2013.01)

(58) Field of Classification Search
CPC .......... B60N 2/686; B60N 2/682; B60N 2/58; B29C 45/14549; B29C 45/14819; B29K 2705/12; B29K 2075/00; B29K 2105/04; B29L 2031/3005; B29L 2031/771
See application file for complete search history.

(56) References Cited

U.S. PATENT DOCUMENTS

| | | | | |
|---|---|---|---|---|
| 3,323,835 A | * | 6/1967 | Barecki | B60N 3/06 297/451.1 |
| 4,707,033 A | | 11/1987 | Stenz et al. | |
| 4,742,984 A | | 5/1988 | Cote et al. | |
| 8,308,235 B2 | | 11/2012 | Ellison et al. | |
| 8,540,318 B2 | | 9/2013 | Folkert et al. | |

(Continued)

*Primary Examiner* — Ryan J. Walters
(74) *Attorney, Agent, or Firm* — David Coppiellie

(57) ABSTRACT

A method of mounting a seat assembly to a vehicle, includes the steps of 1) providing a wire frame assembly having a side rail and engagement features; 2) overmolding a cushion support assembly to the wire frame assembly to form a seat portion assembly, wherein portions of the side rail and the engagement features are exposed; 3) mounting a trim panel to a seat frame within a vehicle interior; 4) mounting one or more support plates having receiving apertures to the seat frame; 5) vertically mounting the seat portion assembly to the trim panel by receiving the exposed portion of the side rail of the wire frame assembly within a clip member of the trim panel; and 6) vertically mounting the seat portion assembly to the support plates by receiving the exposed portions of the engagement features within the receiving apertures of the one or more support plates.

20 Claims, 8 Drawing Sheets

(56) References Cited

U.S. PATENT DOCUMENTS

| | | | | |
|---|---|---|---|---|
| 8,662,589 B2* | 3/2014 | Suzuki | ............... | B60N 2/12 |
| | | | | 297/378.12 |
| 8,876,215 B2 | 11/2014 | Sei et al. | | |
| 9,914,382 B2* | 3/2018 | De Nichilo | ............. | B60N 2/68 |
| 10,596,940 B2* | 3/2020 | Zalzala | ............... | B60N 2/58 |
| 2018/0281643 A1* | 10/2018 | Umezawa | ............. | B60N 2/986 |

* cited by examiner

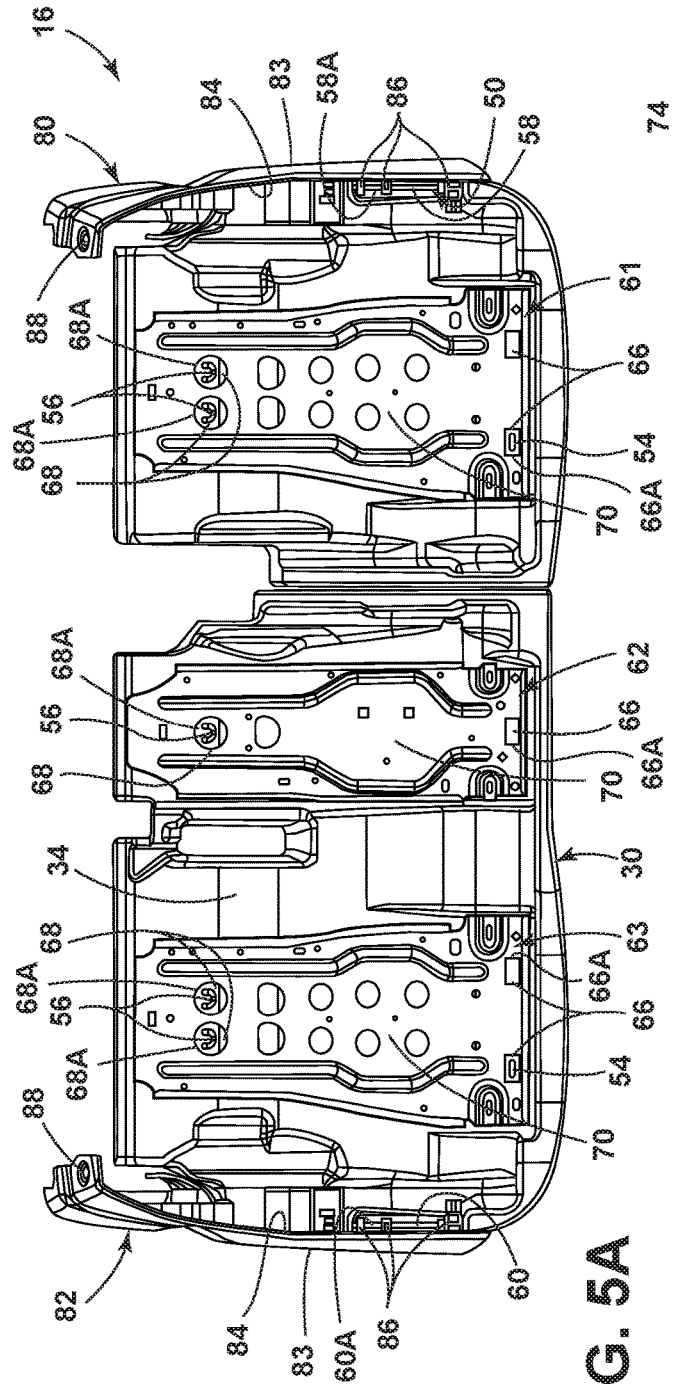
FIG. 5A
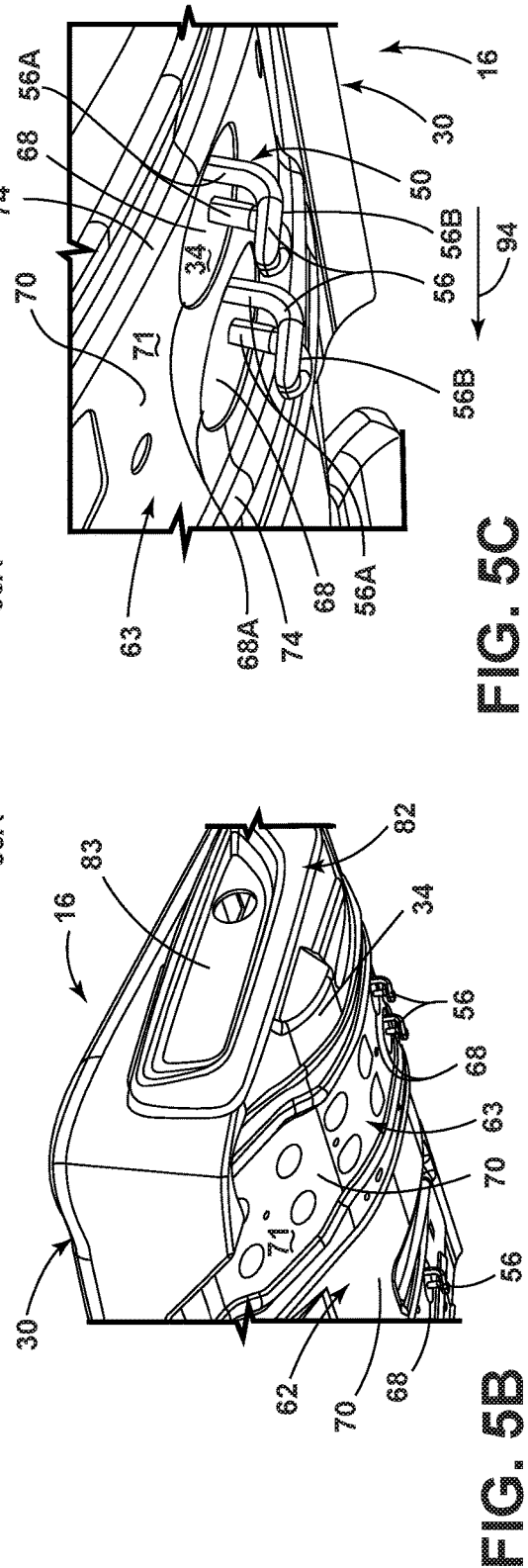
FIG. 5C
FIG. 5B

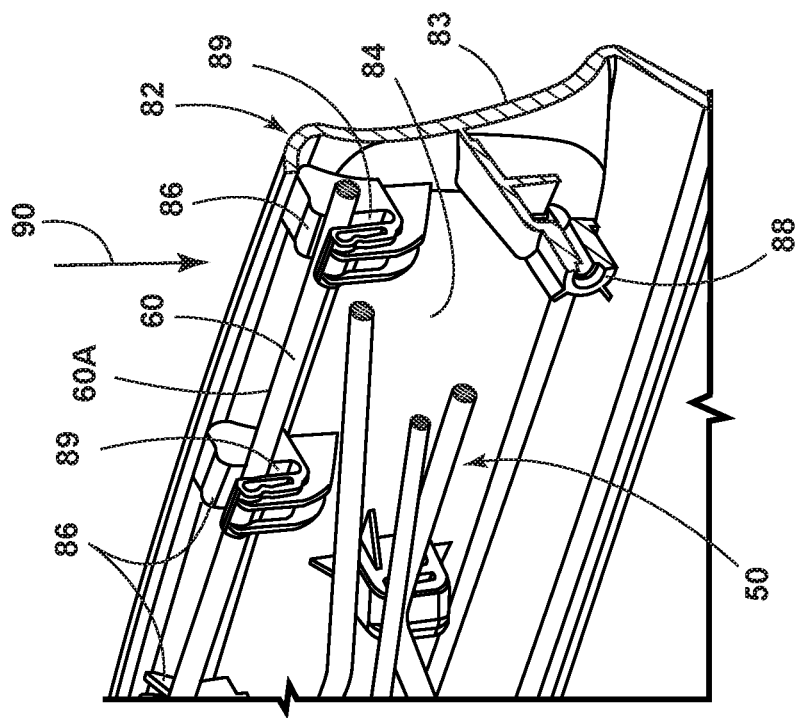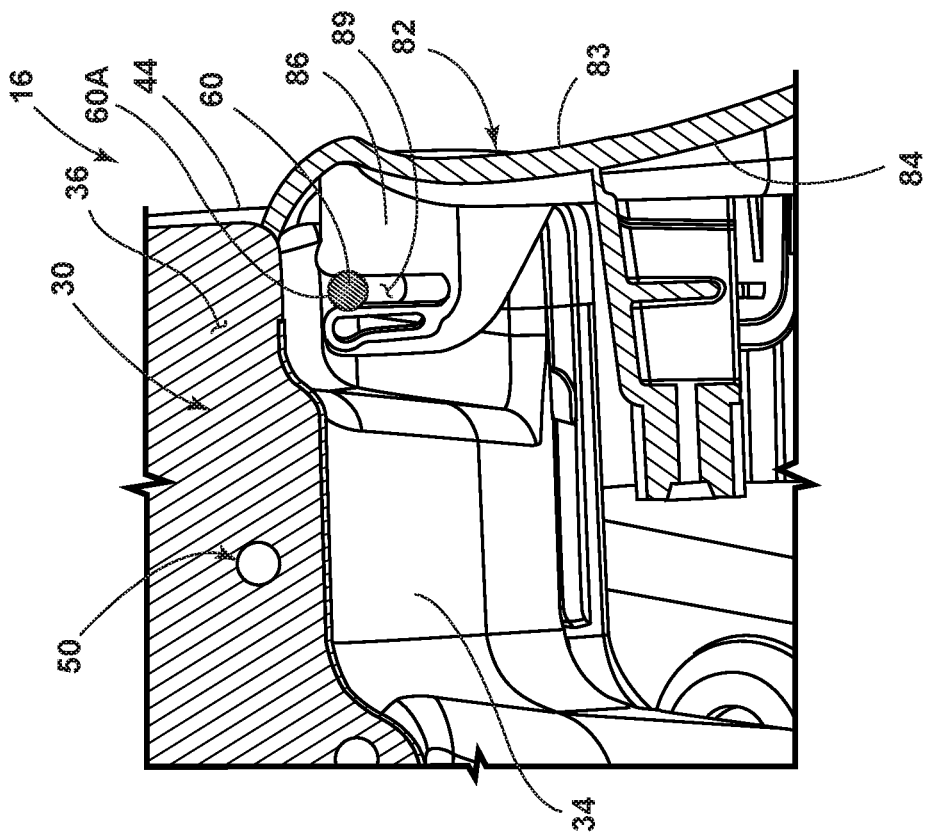

TOP-LOADED SEAT CUSHION SYSTEM

FIELD OF THE INVENTION

The present invention generally relates to rear seat assembly, and more particularly, to a seat assembly having a top-loaded seat cushion support assembly.

BACKGROUND OF THE INVENTION

Currently, rear seat cushion assemblies are installed into vehicles using attachment features that couple to a mounting surface of a vehicle. These installations require cut-out features specifically located in the mounting surface and also generally require hand tools for engaging the attachment features with plastic clip assemblies in the mounting surface. The cushion assemblies in known systems require access and tooling to install and remove the cushion assembly from a vehicle. A vertically loaded cushion assembly is desired that can adequately couple to installed vehicle components without the need for specific access or tooling to coupling locations.

SUMMARY OF THE INVENTION

According to one aspect of the present invention, a method of mounting a seat assembly to a vehicle, includes the steps of 1) providing a wire frame assembly having at least one side rail and one or more engagement features; 2) overmolding a cushion support assembly to the wire frame assembly to form a seat portion assembly, wherein portions of the side rail and the one or more engagement features of the wire frame assembly are exposed; 3) mounting a trim panel having one or more upwardly opening clip members to a seat frame within a vehicle interior; 4) mounting one or more support plates having receiving apertures to the seat frame; 5) vertically mounting the seat portion assembly to the trim panel by receiving the exposed portion of the side rail of the wire frame assembly within the one or more upwardly opening clip members of the trim panel; and 6) vertically mounting the seat portion assembly to the one or more support plates by receiving the exposed portions of the engagement features within the receiving apertures of the one or more support plates.

Embodiments of the first aspect of the invention can include any one or a combination of the following steps:
  laterally retaining the seat portion assembly by coupling the at least one side rail to the trim panel.
  linearly retaining the seat portion assembly by receiving the one or more engagement features of the wire frame assembly in the receiving apertures of the one or more support plates.
  mounting first and second trim panels to the seat frame in a spaced-apart relationship, and further wherein the step of mounting the one more support plates to the seat frame includes mounting one or more support plates to the seat frame between the first and second trim panels.

According to another aspect of the present invention, a method of mounting a seat assembly to a vehicle includes the steps of 1) providing a wire frame assembly; 2) overmolding a cushion support assembly to the wire frame assembly; 3) mounting a trim panel and a support plate to a seat subassembly within a vehicle interior; 4) coupling a side rail of the wire frame assembly to the trim panel; and 5) receiving an engagement feature of the wire frame assembly into a receiving aperture of the support plate.

Embodiments of the second aspect of the invention can include any one or a combination of the following steps:
  laterally retaining the seat portion assembly by coupling the side rail to a clip member of the trim panel.
  linearly retaining the seat portion assembly by receiving the engagement feature in the receiving aperture of the support plate.
  removing the seat portion assembly from the support plate by lifting the seat portion assembly vertically.
  removing the seat portion assembly from the trim panel by lifting the seat portion assembly vertically.
  receiving front and rear engagement features of the wire frame assembly into respective front and rear receiving apertures of the support plate.
  engaging perimeter portions of the front and rear receiving apertures with the front and rear engagement features by moving the wire frame assembly in a car-forward direction.
  partially embedding the side rail and engagement feature of the wire frame assembly in the cushion support assembly.

According to another aspect of the present invention, a method of mounting a seat assembly to a vehicle includes the steps of 1) providing a wire frame assembly having engagement features and first and second side rails; 2) interconnecting a portion of the wire frame assembly with a cushion support assembly to define a seat portion assembly, wherein the portion of the wire frame assembly is embedded within a body portion of the cushion support assembly, and further wherein the engagement feature and side rail of the wire frame assembly outwardly extend from the cushion support assembly; 3) mounting first and second trim panels to a seat frame within a vehicle interior; 4) mounting one or more support plates to the seat frame between the first and second trim panels to define a receiving area therebetween; 5) coupling the first and second side rails of the wire frame assembly to one or more clip members of the respective first and second trim panels; and 6) receiving the engagement features of the wire frame assembly into receiving apertures of the one or more support plates.

Embodiments of the second aspect of the invention can include any one or a combination of the following steps:
  vertically loading the seat portion assembly into the receiving area.
  vertically loading the seat portion assembly into the receiving area.
  receiving front and rear engagement features of the wire frame assembly into respective front and rear receiving apertures of the one or more support plates.
  receiving the first and second side rails of the wire frame assembly in upwardly opening clip channels of the one or more clip members of the first and second trim panels.
  laterally retaining the seat portion assembly by coupling the first and second side rails to the first and second trim panels, respectively; and linearly retaining the seat portion assembly by receiving the engagement features in the receiving apertures of the one or more support plates.
  removing the seat portion assembly from the one or more support plates and the first and second trim panels by lifting the seat portion assembly vertically.
  overmolding the cushion support assembly to the portion of the wire frame assembly.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5A is a bottom plan view of the seat assembly of FIG. 3;

FIG. 5B is a fragmentary bottom perspective view of the seat assembly of FIG. 5A;

FIG. 5C is a close-up bottom perspective view of the seat assembly of FIG. 5B;

FIG. 6A is a cross-sectional view of the seat assembly of FIG. 3 taken at line VIA;

FIG. 6B is a top perspective cross-sectional view of the seat assembly of FIG. 6A with cushion materials removed therefrom.

DETAILED DESCRIPTION OF THE PREFERRED EMBODIMENTS

Figure 1:
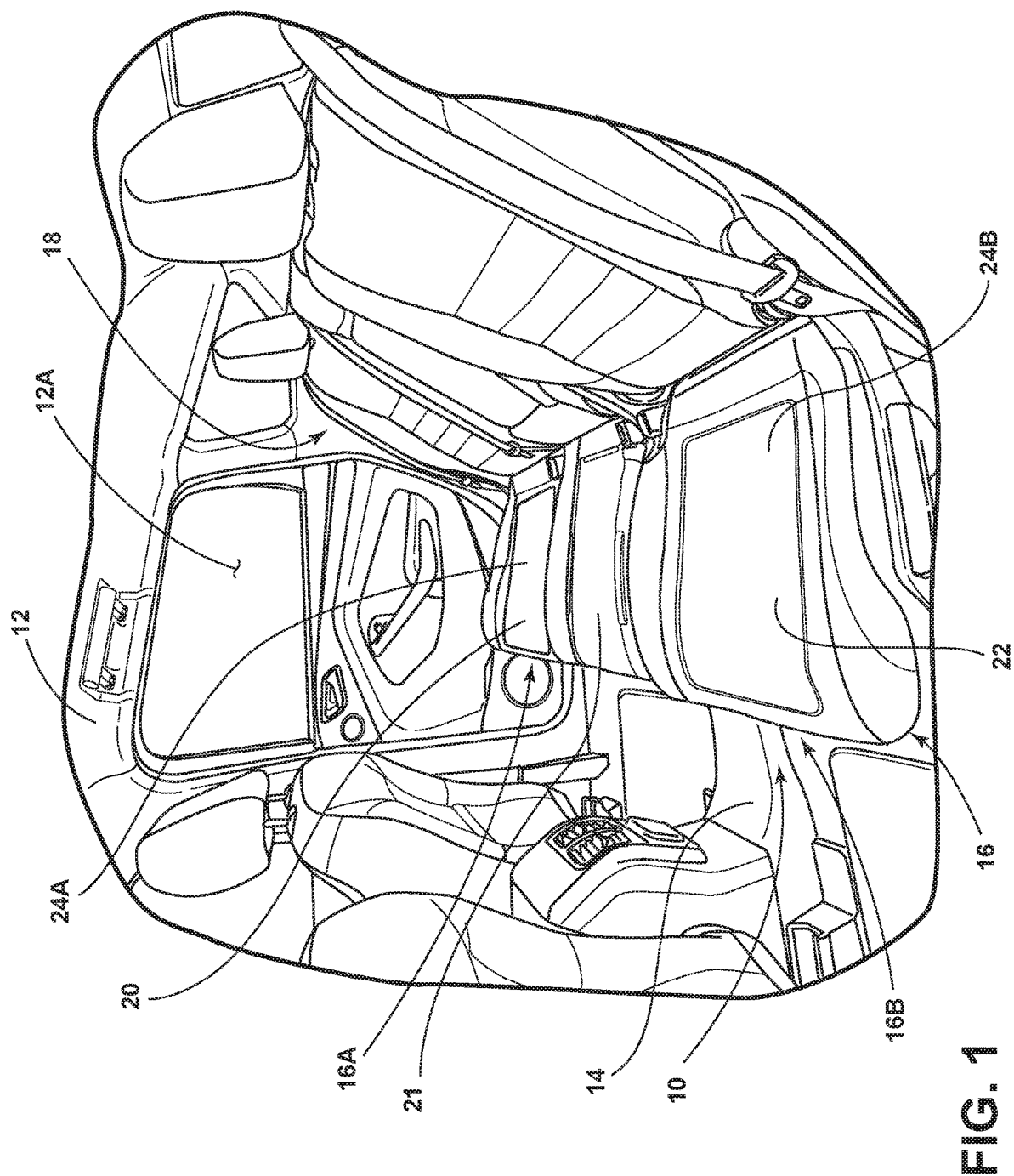
FIG. 1 is a fragmentary top perspective view of a seat assembly disposed in a rear portion of a vehicle interior.

Referring now to FIG. 1, a seat assembly 10 is shown disposed within an interior 12A of a vehicle 12. Specifically, the seat assembly 10 is disposed within the vehicle interior 12A in a rear position of the vehicle interior 12A in FIG. 1, however, it is contemplated that the seat assembly 10, or various components and features thereof, can be disposed in other seat assemblies positioned in other areas of a vehicle interior 12A, such as a third row seating option. The seat assembly 10 is operably coupled to the vehicle body 14, as further described below, and generally includes a substantially horizontal seat portion assembly 16 and a substantially upright seatback assembly 18. It is contemplated that the seatback assembly 18 is a pivoting member configured for pivotal movement relative to the seat portion assembly 16, and may be folded down to provide extended cargo space within the vehicle interior 12A.

The vehicle seating assembly 10, as set forth herein, is generally configured for use as rear seating assembly for a vehicle. It is contemplated that the vehicle 12 may be a sport utility vehicle, a van, a car, etc. It is also contemplated that the seat assembly 10 can take on a variety of configurations, and is not limited to the structure as set forth herein. Further, the concept, as set forth herein, can be applied to bench-type seating, 40/60 seating, or any other vehicle seating arrangement, as understood by one having ordinary skill in the art.

With particular reference to the seat portion assembly 16 shown in FIG. 1, the seat portion assembly 16 is a multi-part assembly that includes a first seat portion 16A and a second seat portion 16B. It is also contemplated that the seat assembly 10 of the present concept can include a unitary bench-type seating arrangement. In the embodiment shown in FIG. 1, the first seat portion 16A includes a right-side seat assembly 20, while the second seat portion 16B includes a left-side seat assembly 22, and further includes a middle seat assembly 21 disposed in between the right-side seat assembly 20 and the left-side seat assembly 22. The first and second seat portions 16A, 16B of the seat portion assembly 16 shown in FIG. 1 are covered with upholstered seat covers 24A, 24B, respectively. The seat covers 24A, 24B cover various support and frame materials of the seat assembly 10, such as cushion support materials which are used to provide increased cushioned support for a vehicle occupant at the seat portion assembly 16. The seat covers 24A, 24B are contemplated to be comprised of a suitable natural or synthetic material, or any combination thereof, that generally covers the cushion materials and frame components of the seat assembly 10. The cushion and frame materials of the seat assembly 10 are further described below.

Figure 2A:
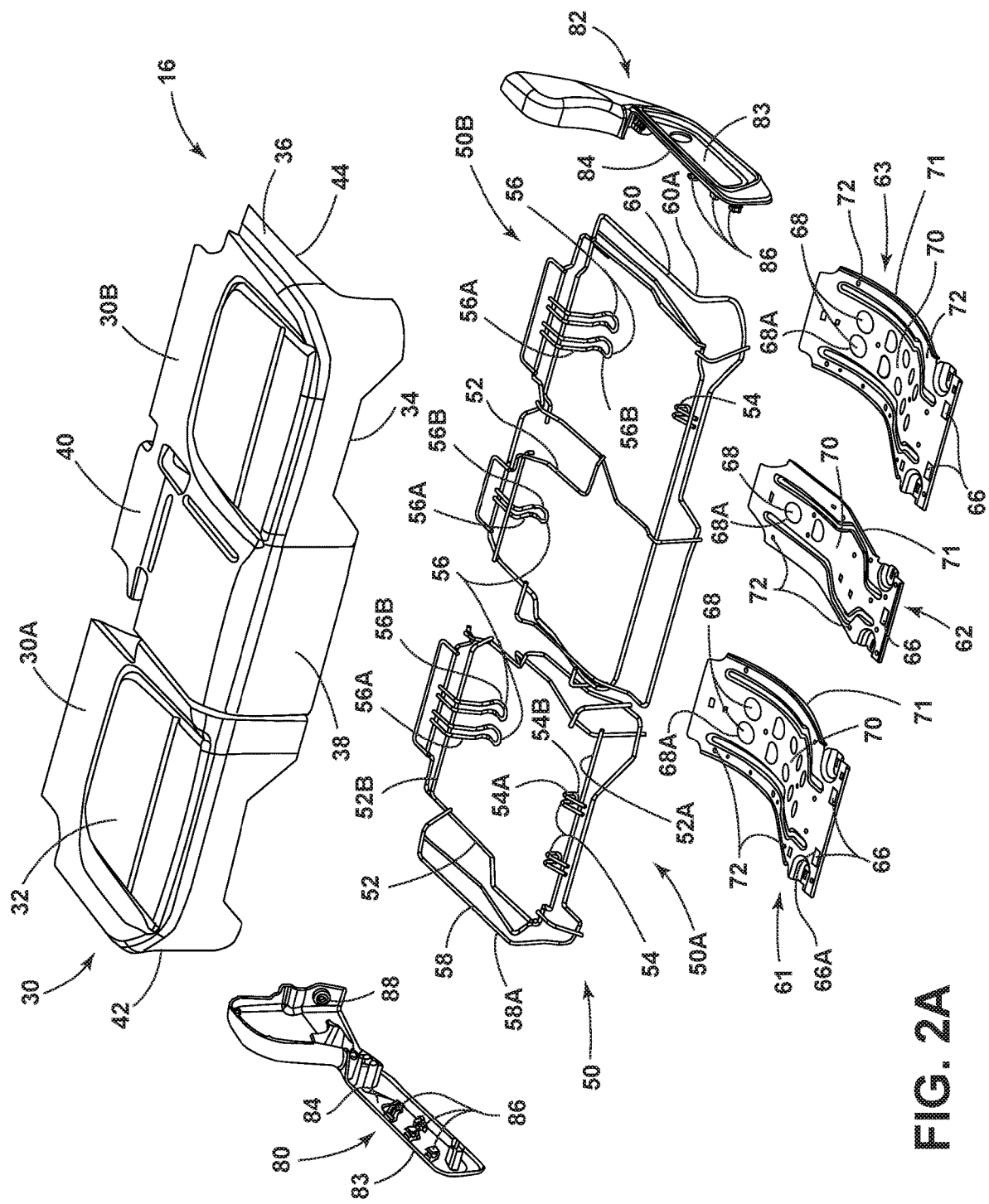
FIG. 2A is an exploded top perspective view of the seat assembly of FIG. 1 as removed from the vehicle interior.

Referring now to FIG. 2A, the seat portion assembly 16 is shown in an exploded view as removed from vehicle 12 of FIG. 1. In the exploded view of FIG. 2A, the seat portion assembly 16 is shown as having a cushion support assembly 30 which is comprised of first and second portions 30A, 30B. In assembly, the first and second portions 30A, 30B of the cushion support assembly 30 are contemplated to be covered by the seat covers 24A, 24B shown in FIG. 1. The cushion support assembly 30 is contemplated to comprised of a foam material, such as polyurethane foam, for example, that provides cushioned support for a vehicle occupant. In assembly, the cushion support assembly 30 is contemplated to be overmolded to a wire frame assembly 50, as further described below. Taken together, the first and second portions 30A, 30B of the cushion support assembly 30 include an upper surface 32 and a bottom surface 34. The upper surface 32 is configured to provide support to a vehicle occupant for support as seated thereon. A body portion 36 is disposed between the upper surface 32 and bottom surface 34. The body portion 36 includes front and rear portions 38, 40 as well as first and second sides 42, 44. The cushion support assembly 30 may be a unitary member, or may be comprised of the first and second portions 30A, 30B as shown in FIG. 2A. The features and portions described above with reference to the cushion support assembly 30 are applicable to a unitary assembly, and are also applicable to each portion 30A or 30B of the cushion support assembly 30 taken individually. It is contemplated that the cushion support assembly 30 may include portions of varying density to provide a foamed member with cushioning support where needed for comfort, and more rigid support where needed for properly positioning and supporting a seat occupant.

As further shown in FIG. 2A, the wire frame assembly 50 is shown having first and second portions 50A, 50B. Each of the first and second portions 50A, 50B include a support frame 52 having front and rear engagement features 54, 56. The front engagement features 54 are disposed on a front portion 52A of the support frame 52, while the rear engagement features 56 are disposed on a rear portion 52B of the support frame 52. The front engagement features 54 each include downwardly extending portions 54A and forwardly extending portions 54B. Similarly, the rear engagement features 56 each include downwardly extending portions 56A and forwardly extending portions 56B. In this way, the front and rear engagement features 54, 56 define hook members extending downwardly from the wire frame assembly 50. The support frame 52 of the wire frame assembly 50 further includes first and second side rails 58, 60 that interconnect the front portion 52A and rear portion 52B of the wire frame assembly 50. The first and second side rails 58, 60 are disposed on opposite sides of the wire frame assembly 50. It is contemplated that the wire frame assembly 50 may be a unitary member, or may be comprised of multiple portions, such as first and second portions 50A, 50B shown in FIG. 2A.

In assembly, the wire frame assembly 50 is contemplated to be partially embedded within the body portion 36 of the cushion support assembly 30 by an overmolding or insert molding technique, such that the support frame 52 of the wire frame assembly 50 is substantially embedded and interconnected with the body portion 36 of the cushion support assembly 30. In this way, the cushion support assembly 30 and the wire frame assembly 50 are integrated and interconnected in assembly. Thus, the support frame 52, describes the portion of the wire frame assembly that is covered by the cushion support assembly 30 and interconnected therewith. With specific reference to the embodiment shown in FIG. 2A, the first portion 50A, of the wire frame assembly 50 is contemplated to be embedded within the first portion 30A of the cushion support assembly 30. Similarly, the second portion 50B, of the wire frame assembly 50 is contemplated to be embedded within the second portion 30B of the cushion support assembly 30. The front and rear engagement features 54, 56 of the wire frame assembly 50 are configured to have portions which extend outwardly from the bottom surface 34 of the cushion support assembly 30 for engagement with support plates 61, 62 and 63, as further described below. The first and second side rails 58, 60 of the wire frame assembly 50 are configured to include outwardly accessible exposed portions 58A, 60A (FIG. 5A) which are configured to couple to first and second trim panels 80, 82, as further described below.

As further shown in FIG. 2A, the support plates 61, 62 and 63 are each shown as having front and rear receiving apertures 66, 68 disposed through body portions 70 thereof. The body portions 70 of the support plates 61, 62 and 63 each include lower surfaces 71. The front receiving apertures 66 are shown in the form of square slots having perimeter portions 66A. The rear receiving apertures 68 are shown in the form of round apertures having round perimeter portions 68A. The support plates 61, 62 and 63 further include a plurality of mounting apertures 72 disposed therethrough and located at various locations along the body portions 70 for mounting the support plates 61, 62 and 63 to a seat subassembly (not shown) that is ultimately coupled to the vehicle body 14. The seat subassembly may include a seat frame having front and rear cross-members that are interconnected by side members and intermediate members to provide a rigid structure to fixedly mount to the vehicle body 14 for mounting the support plates 61, 62 and 63. In the embodiment of FIG. 2A, three support plates 61, 62 and 63, are shown, however, it is contemplated that any number of support plates may be used to couple to the wire frame assembly 50 and the cushion support assembly 30, in a manner as further described below. With the support plates 61, 62 and 63 rigidly coupled to the vehicle body 14 through a seat subassembly, the support plates 61, 62 and 63 can retain the wire frame assembly 50 and the cushion support assembly 30 in the proper position as shown in FIG. 1. The support plates 61, 62 and 63 further include standoff features 74 shown in the form of ribs which downwardly extend from the body portion 70.

As further shown in FIG. 2A, trim panels 80, 82 are provided having upright walls 83 with inner surfaces 84. One or more clip members 86 are shown extending inwardly from the inner surfaces 84 of the upright walls 83. In assembly, the clip members 86 include upwardly opening clip channels 89 (FIGS. 6A, 6B) which are configured to vertically receive the exposed portions 58A, 60A of the first and second side rails 58, 60 of the wire frame assembly 50. In assembly, the engagement between the clip members 86 of the first and second trim panels 80, 82 and the side rails 58, 60 of the wire frame assembly 50 laterally retains the cushion support assembly 30 and wire frame assembly 50, such that the seat portion 16 (FIG. 1) does not move laterally within the vehicle interior 12A. The first and second trim panels 80, 82 further include mounting apertures 88 that can be used to mount the first and second trim panels 80, 82 to the seat subassembly that is coupled to the vehicle body 14, as described above, to rigidly couple the first and second trim panels 80, 82 in a spaced-apart relationship as shown in FIG. 2B.

As noted above, the cushion support assembly 30 is contemplated to be comprised of a foam material that is overmolded to the wire frame assembly 50. The wire frame assembly 50 is contemplated to be comprised of a steel bar material that is formed into the structure shown in FIG. 2A. The support plates 61, 62 and 63 are seat pan structures contemplated to be comprised of a stamped metal material, such as steel, for providing a rigid support structure for coupling to the wire frame assembly 50 and cushion support assembly 30. The first and second trim panels 80, 82 are contemplated to be comprised of injection molded polymeric materials to provide unitary assemblies for the first and second trim panels 80, 82.

Figure 2B:
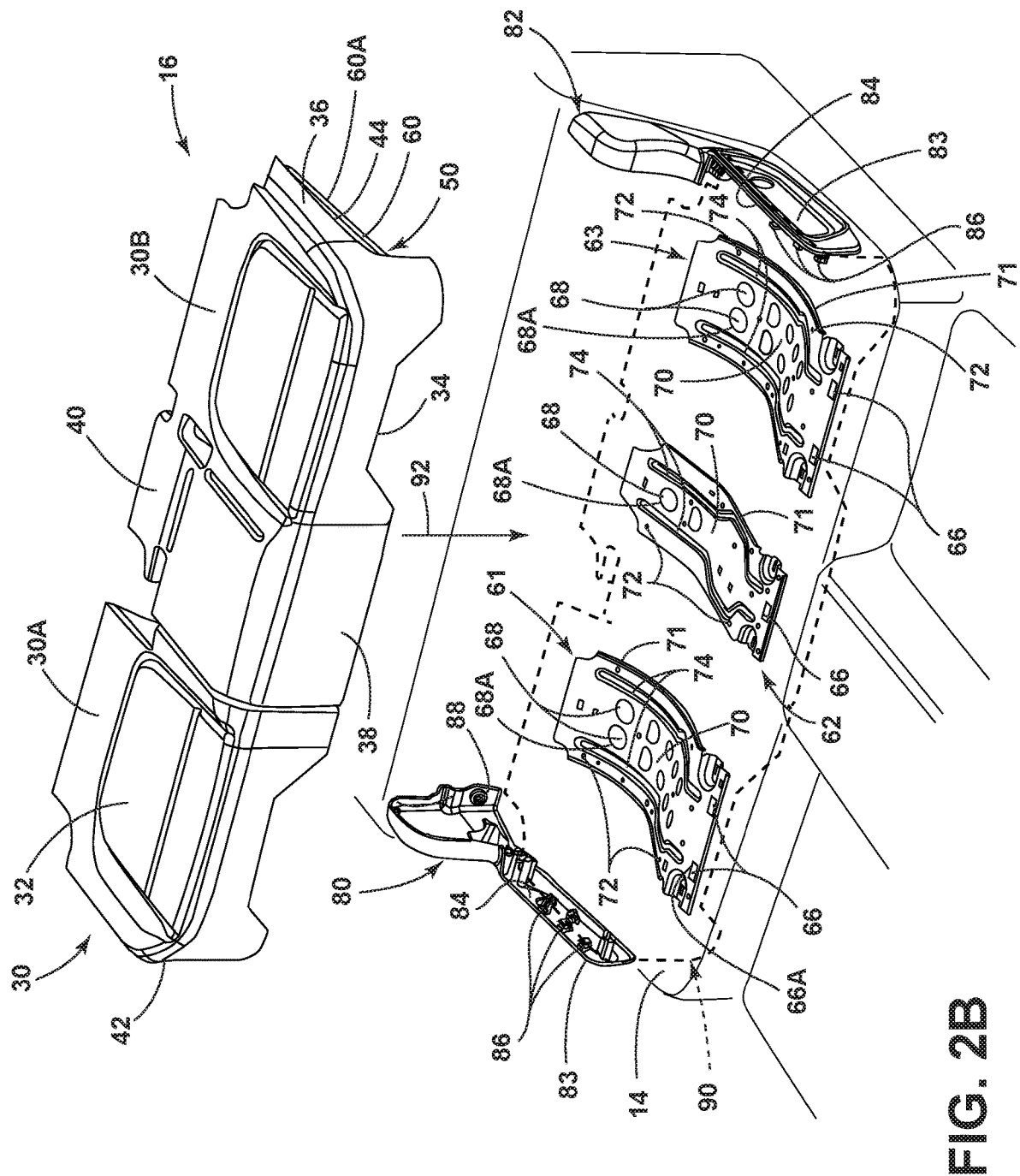
FIG. 2B is a top perspective view of a cushion support assembly positioned for installation in a vehicle.

Referring now to FIG. 2B, the cushion support assembly 30 is shown as being overmolded to the wire frame assembly 50. As coupled together, the cushion support assembly 30 and the wire frame assembly 50 define the assembled seat portion assembly 16. It is contemplated that the cushion support assembly 30 may be compression molded around the wire frame assembly 50, or the wire frame assembly 50 may be used in an insert molding technique, wherein the wire frame assembly 50 is suspended within a mold and the cushion support assembly 30 is formed around the wire frame assembly 50 within the mold. The assembled seat portion assembly 16 is contemplated to provide an integrated coupling between the cushion support assembly 30 and the wire frame assembly 50 with the support frame 52 (FIG. 2A) of the wire frame assembly 50 being substantially embedded within the body portion 36 of the cushion support assembly 30.

As further shown in FIG. 2B, the trim panels 80, 82 are spaced-apart from one another and coupled to the seat subassembly (not shown) which is further coupled to the vehicle body 14. The support plates 61, 62 and 63 are shown positioned in the space defined between the trim panels 80, 82. Collectively, the trim panels 80, 82 and the support plates 61, 62, and 63 define a receiving area 90 that is positioned between the trim panels 80, 82 and further positioned above the support plates 61, 62, and 63. In FIG. 2B, the receiving area 90 is shown in phantom and is where the seat portion assembly 16 is received in assembly in a vertical direction as indicated by arrow 92. In this way, the present concept provides for a top-loaded seat portion assembly 16 that can be set in-place within the receiving area 90 for drop-in style loading of the seat portion assembly 16. In FIG. 2B, the wire frame assembly 50 is shown at the second side 44 of the cushion support assembly 30 with side rail 60 having the exposed portion 60A outwardly accessible to couple to the clip members 86 of the trim panel 82 in a releasable manner. Similarly, the side rail 58 (FIG. 2A) includes the exposed portion 58A, much like exposed portion 60A of side rail 60, which is also outwardly accessible to couple to the clip members 86 of the trim panel 80 in a releasable manner. Thus, the side rails 58 and 60 are partially embedded within the body portion 36 of the cushion support assembly 30, and include the exposed portions 58A, 60A which are accessible for coupling to the trim panels 80, 82. In this way, the seat portion assembly 16 is releasably coupled in a vertical manner with the trim panels 80, 82. The engagement of the wire frame assembly 50 with the trim panels 80, 82 is further described below with reference to FIGS. 6A and 6B.

Figure 3:
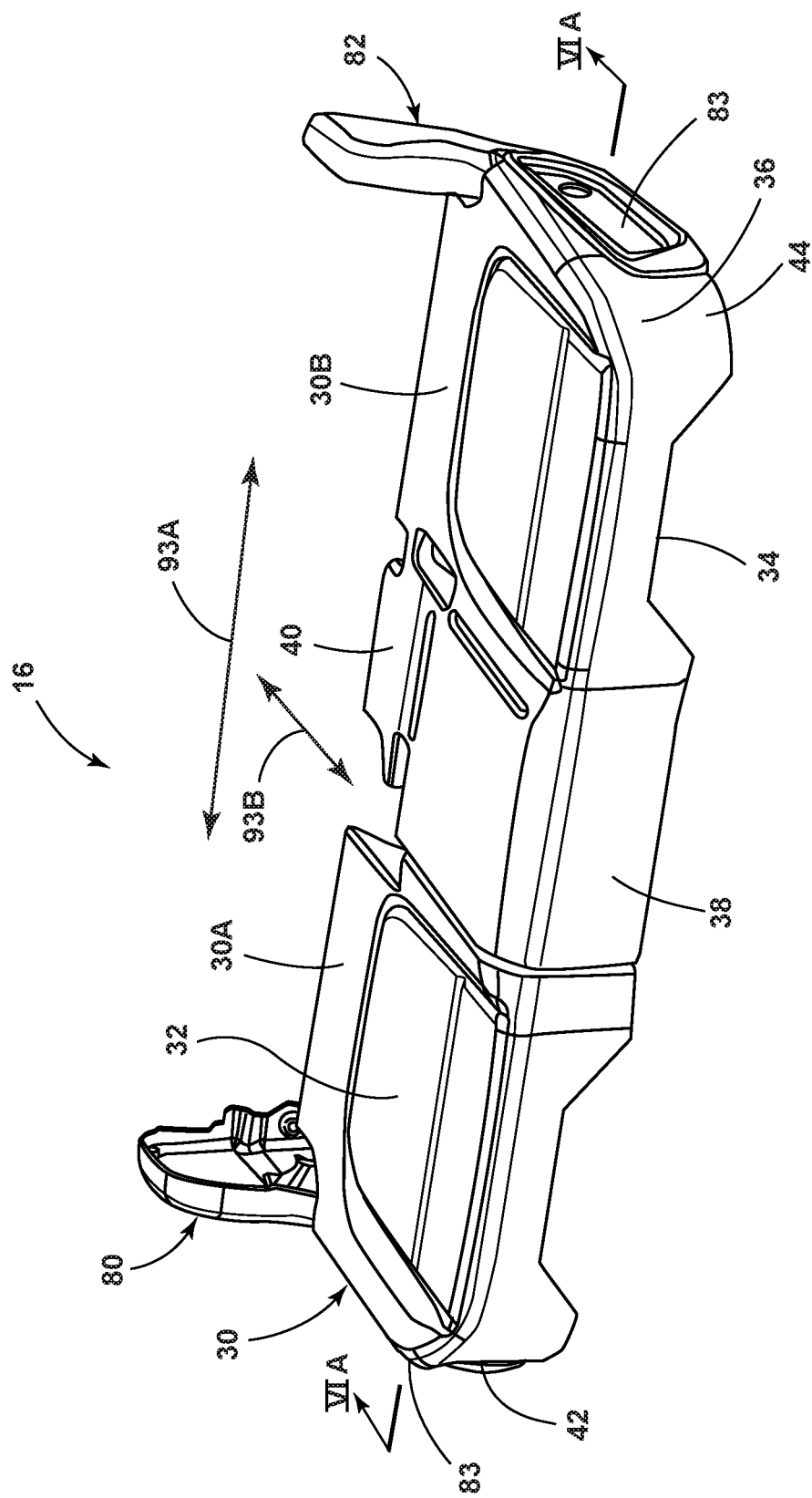
FIG. 3 is a top perspective view of the seat assembly of FIG. 2A in an assembled condition.

Referring now to FIG. 3, the seat portion assembly 16 is shown received in the receiving area 90 (FIG. 2B), such that the wire frame assembly 50 (FIG. 2B) of the seat portion assembly 16 is contemplated to be coupled to the trim panels 80, 82 when the seat portion assembly 16 is received in the receiving area 90. Further, the front and rear engagement features 54, 56 of the wire frame assembly 50 are contemplated to be received in the front and rear receiving apertures 66, 68, respectively, of the support plates 61, 62, and 63 when the seat portion assembly 16 is received in the receiving area 90.

Figure 4:
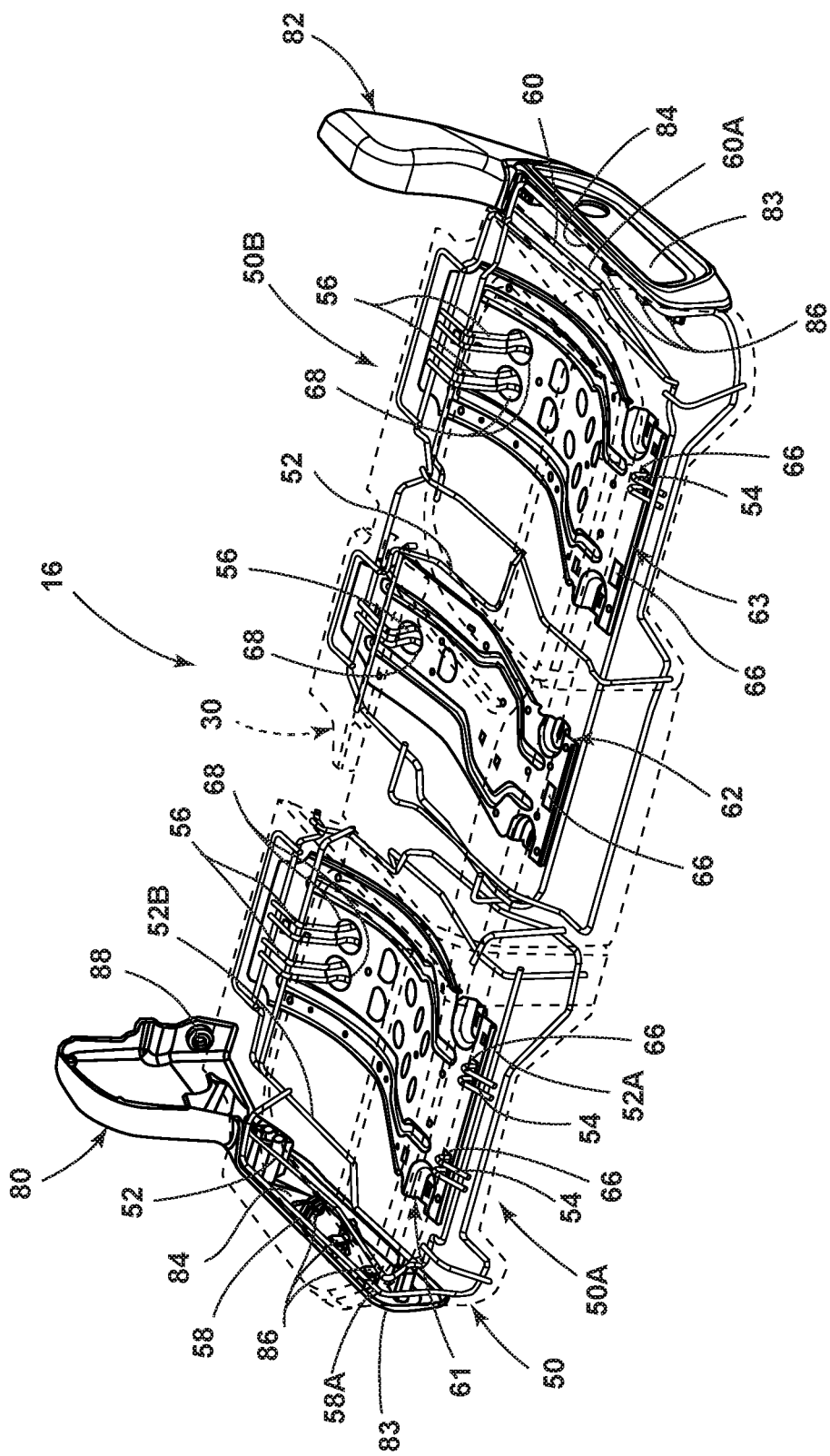
FIG. 4 is a top perspective view of the seat assembly of FIG. 3 with cushion materials of the seat assembly shown in phantom.

Referring now to FIG. 4, the cushion support assembly 30 is shown in phantom to reveal the wire frame assembly 50 partially embedded within and interconnected with the cushion support assembly 30. The wire frame assembly 50 includes the front and rear engagement features 54, 56, which are received within the front and rear receiving apertures 66, 68, respectively, of the support plates 61, 62, and 63. It is contemplated that the front engagement features 54 may be hooked into the square shaped slots of the front receiving apertures 66, such that the rear portion 40 of the cushion support assembly 30 can be rotated downward into a fully received position (FIG. 3). This rotation will provide for the rear engagement features 56 of the wire frame assembly 50, as coupled to the cushion support assembly 30, to be received within the receiving apertures 68 of the support plates 61, 62 and 63. Further, it is contemplated that the entire seat portion assembly 16 may be lowered vertically into the receiving area 90 (FIG. 2B) in a direction as indicated by arrow 92 (FIG. 2B). As the seat portion assembly 16 is lowered into the receiving area 90, the outwardly exposed portions 58A, 60A of the side rails 58, 60 of the wire frame assembly 50 will couple to the upwardly opening clip members 86 of the trim panels 80, 82, and the front and rear engagement features 54, 56 will be received in the front and rear receiving apertures 66, 68, respectively. In this way, the front and rear engagement features 54, 56 are vertically received within the front and rear receiving apertures 66, 68, respectively, while the side rails 58 and 60 of the wire frame assembly 50 are vertically received into the clip members 86 of the trim panels 80, 82. The side rails 58 and 60 and the engagement features 54, 56 of the wire frame assembly 50 are releasably coupled to their respective components, such that the seat portion assembly 16 of the present concept is contemplated to be vertically removable from the receiving area 90 (FIG. 2B) for servicing.

With reference to FIGS. 3 and 4, the seat portion assembly 16 is restrained from lateral movement (as indicated by arrow 93A, FIG. 3) between the trim panels 80, 82, as clipped to the clip members 86 thereof, when the seat portion assembly 16 is releasably coupled in the receiving area 90 (FIG. 2B). Further, the seat portion assembly 16 is retained by the support plates 61, 62 and 63 by the engagement of the front and rear engagement features 54, 56 of the wire frame assembly 50 with the front and rear receiving apertures 66, 68, respectively, of the support plates 61, 62 and 63 from forward and rearward linear movement (as indicated by arrow 93B, FIG. 3) within the vehicle cabin 12A (FIG. 1). Such retention between the seat portion assembly 16 and the support plates 61, 62 and 63 provides restraint of the sear portion assembly 16 in case of a rear impact event, wherein the seat portion assembly 16 may be under forces urging movement of the seat portion assembly 16 (and the cushion support assembly 30 and wire frame assembly 50 thereof) in a car-forward direction. This retention of the seat portion assembly 16 is further described below with reference to FIGS. 5A and 5B. While linearly and laterally restrained, the seat portion assembly 16 of the present concept is still vertically removable as releasably coupled to the support plates 61, 62 and 63 and the trim panels 80, 82 in a vertical direction, as further described below.

Referring now to FIG. 5A, a bottom plan view of the seat portion assembly 16 is shown with the front and rear engagement features 54, 56 of the wire frame assembly 50 are shown as being received within front and rear receiving apertures 66, 68, respectively, of the support plates 61, 62 and 63. The exposed portions 58A, 60A of the side rails 58, 60 are shown clipped to the clip members 86 of the trim panels 80, 82.

Referring now to FIGS. 5B and 5C, the rear engagement features 56 of the wire frame assembly 50 as shown extending through the rear receiving apertures 68 of the support plate 63. In this way, the rear engagement features 56 extend outwardly, in a downward direction, from the bottom surface 34 of the cushion support assembly 30 to be releasably received through the receiving apertures 68 of the support plate 63. With the downwardly extending portions 56A and the forwardly extending portions 56B of the rear engagement features 56, if the seat portion assembly 16 were to move in a car-forward direction along the path as indicated by arrow 94, the downwardly extending engagement features 56, and the hook members thereof, would engage with the perimeter portions 68A of the receiving apertures 68 of the support plate 63, which, as noted above, is contemplated to be fixedly coupled to the vehicle frame 14 (FIG. 2B). As such, during a rear impact event, should the seat portion assembly 16 move in a car-forward direction relative to the trim panels 80, 82 and the support plates 61, 62 and 63, the seat portion assembly 16 will still be retained by the same.

Similarly, it is contemplated that the front engagement features 54 of the wire frame assembly 50 extend outwardly in a downward direction from the bottom surface 34 of the cushion support assembly 30 for engagement and reception within the front receiving apertures 66 of the support plates 61, 62 and 63. These downwardly extending front engagement features 54, and the hook members thereof, will engage the perimeter portions 66A of the front receiving apertures 66 when the seat portion assembly 16 moves in a car-forward or car-rearward direction. With further reference to FIG. 5A, the support plates 61, 62 and 63 are shown abuttingly engaged with the bottom surface 34 of the cushion support assembly 30 and it is further contemplated that the standoff features 74, shown in FIG. 5C, provide the spacing between the vehicle frame 14 and the support plates 61, 62 and 63 for the downwardly extending engagement features 56 to reside in a received relationship with the receiving apertures 68 of the support plates 61, 62 and 63. The standoff features 74 also provide the spacing necessary for the front engagement features 54 of the wire frame assembly 50 to be received through the front receiving apertures 66 of the support plates 61, 62 and 63.

As further shown in FIG. 5C, the receiving apertures 68 of the support plate 63 are sized to vertically receive the rear engagement features 56 of the wire frame assembly 50. This is true even with the L-shaped configuration of the hook members of the rear engagement features 56 as defined by the downwardly extending portion 56A and forward extending portion 56B. As such, the size of the front and rear receiving apertures 66, 68 are configured to include perimeter portions 66A, 66B that can accommodate directly vertical insertion of the front and rear engagement features 54, 56, regardless of the configuration of the front and rear engagement features 54, 56. In this way, the front and rear engagement features 54, 56 of the wire frame assembly 50 are releasably received in the front and rear receiving apertures 66, 68 of the support plates 61, 62 and 63, respectively. Thus, the entire seat portion assembly 16 can be vertically lifted from the receiving area 90 (FIG. 2B) for servicing or replacement.

Referring now to FIG. 6A, the seat portion assembly 16 is shown in a cross-sectional view as coupled to the trim panel 82, via the exposed portion 60A of side rail 60 of the wire frame assembly 50. As noted above, the exposed portion 60A of the side rail 60 of the wire frame assembly 50 runs adjacent to the side portion 44 of the cushion support assembly 30 and below the bottom surface 34 thereof. The exposed portion 60A of the side rail 60 is clipped into the clip member 86 at the upwardly opening clip channels 89 of the clip members 86. In this way, the exposed portion 60A of the side rail 60 can be vertically received in the upwardly opening clip channel 89 of the clip members 86 as the seat portion assembly 16 is vertically received on, and coupled to, the trim panel 82 in the direction as indicated by arrow 92 in FIG. 2B. Thus, the seat portion assembly 16 can be vertically received for engagement of the front and rear engagement features 54, 56 within the receiving apertures 66, 68 of the support plates 61, 62 and 63, while the exposed portions 58A, 60A of the side rails 58, 60 are clipped to the respective side panels 80, 82 in a vertical manner. In this way, the seat portion assembly 16 can be vertically removed as releasably coupled the trim panels 80, 82 as well as being releasably coupled to the support plates 61, 62 and 63, so that the seat portion assembly 16 can be lifted and removed from a vehicle for service or replacement.

Referring now to FIG. 6B, the exposed portion 60A of the side rail 60 is shown clipped to a plurality of clip members 86 of the trim panel 82 at the upwardly opening clip channels 89 thereof. In FIG. 6B, the cushion support assembly 30 has been removed to show the engagement of the exposed portion 60A of the side rail 60 of the wire frame assembly 50 with the trim panel 82. It is contemplated that the exposed portion 58A (FIG. 2A) of the wire frame assembly 50 also couples to multiple clip members 86 disposed on the trim panel 80 in a similar fashion as shown in FIG. 6B with regards to the exposed portion 60A of the side rail 60.

Figure 7:
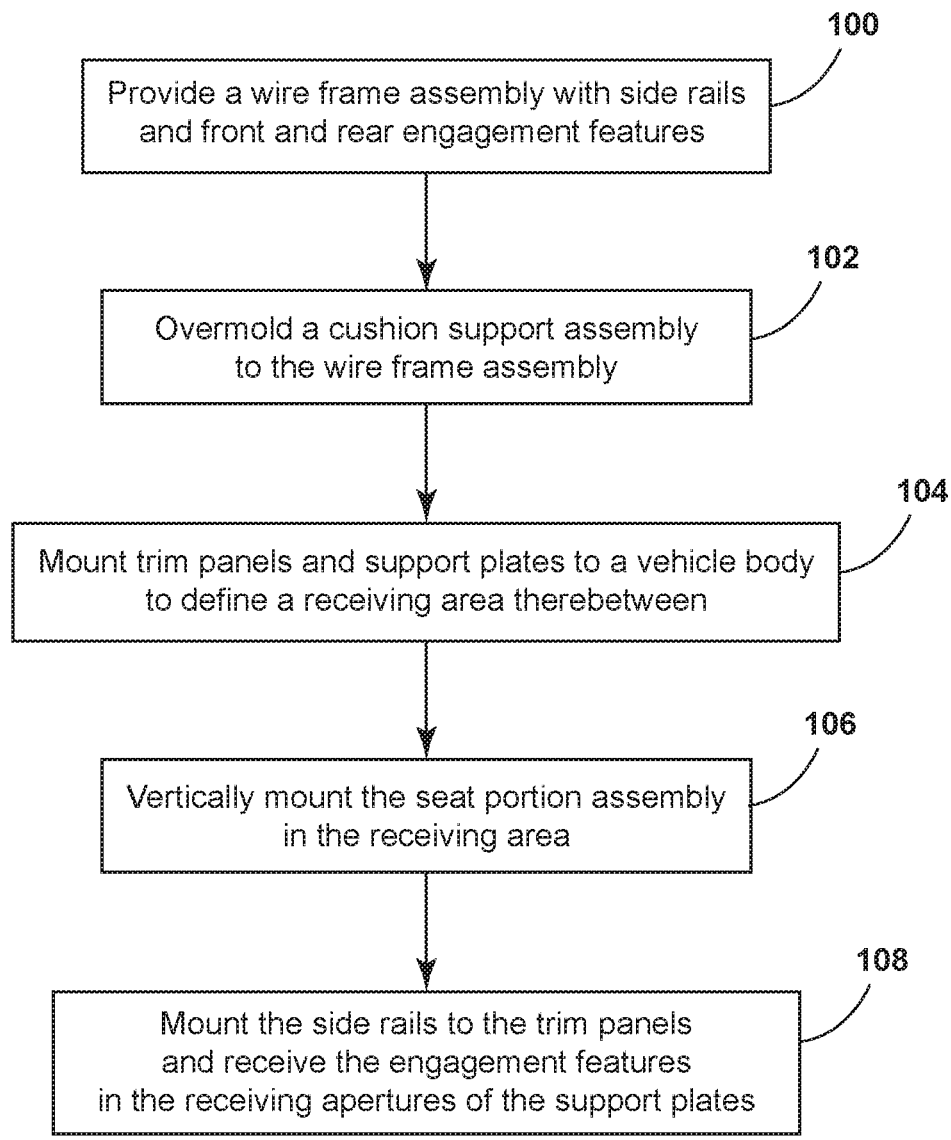
FIG. 7 is a flow chart showing the steps of mounting a top-loaded seat portion assembly to a vehicle.

The present concept further includes a method of installing a seat assembly in a vehicle. As noted above, the seat portion assembly 16 can be vertically installed on the support plates 61, 62 and 63, as well as the trim panels 80, 82. Normally, a seat structure is assembled outside of a vehicle and a cushion assembly is coupled to the seat structure along with the plastic trim components. Then, the entire seat assembly is installed in the vehicle. The present concept allows for the seat structure components to be in installed in a vehicle, and then the seat portion assembly 16 can be installed on the components. The method of building and installing a seat assembly includes the following steps as shown in FIG. 7. First, the wire frame assembly 50 is provided and includes side rails 58, 60 and front and rear engagement features 54, 56 in step 100. The cushion support assembly 30 is then overmolded to the wire frame assembly 50 in step 102, such that the wire frame assembly 50 and cushion support assembly 30 are interconnected to define the seat portion assembly 16. Portions 58A and 60A of the side rails 58, 60 and the front and rear engagement features 54, 56 are partially embedded in the body portion 36 of the cushion support assembly 30, such that exposed portions of the same are accessible for coupling to the trim panels 80, 82 and the support plates 61, 62 and 63, respectively. In step 104, the trim panels 80, 82 and the support plates 61, 62 and 63 are mounted to a seat subassembly that is mounted to the vehicle body 14 to define a receiving area 90 therebetween. In step 106, the seat portion assembly 16 is vertically received in the receiving area. The side rails 58, 60 are mounted to the trim panels 80, 82 and the front and rear engagement features 54, 56 are received in the front and rear receiving apertures 66, 68 of the support plates 61, 62 and 63 in step 108. In this way, the seat portion assembly 16 is laterally and linearly retained within the receiving area 90, as described above.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of mounting a seat assembly to a vehicle, comprising:
   providing a wire frame assembly having at least one side rail and one or more engagement features;
   overmolding a cushion support assembly to the wire frame assembly to form a seat portion assembly, wherein portions of the side rail and the one or more engagement features of the wire frame assembly are exposed;
   mounting at least one trim panel having one or more upwardly opening clip members to a seat frame within a vehicle interior;
   mounting one or more support plates having receiving apertures to the seat frame;
   vertically mounting the seat portion assembly to the at least one trim panel by receiving the exposed portion of the side rail of the wire frame assembly within the one or more upwardly opening clip members of the at least one trim panel; and
   vertically mounting the seat portion assembly to the one or more support plates by receiving the exposed portions of the engagement features within the receiving apertures of the one or more support plates.

2. The method of claim 1, including:
   laterally retaining the seat portion assembly by coupling the at least one side rail to the at least one trim panel.

3. The method of claim 2, including:
   linearly retaining the seat portion assembly by receiving the one or more engagement features of the wire frame assembly in the receiving apertures of the one or more support plates.

4. The method of claim 1, wherein the at least one trim panel includes first and second trim panels, and further wherein the step of mounting the trim panel to the seat frame further includes mounting the first and second trim panels to the seat frame in a spaced-apart relationship, and further wherein the step of mounting the one or more support plates to the seat frame includes mounting one or more support plates to the seat frame between the first and second trim panels.

5. A method of mounting a seat assembly to a vehicle, comprising:
providing a wire frame assembly having a side rail;
overmolding a cushion support assembly to the wire frame assembly to define a seat portion assembly, wherein the side rail includes an exposed portion that is outwardly accessible relative to the cushion support assembly;
mounting a trim panel and a support plate to a vehicle body within a vehicle interior;
coupling the exposed portion of the side rail of the wire frame assembly to the trim panel; and
receiving an engagement feature of the wire frame assembly into a receiving aperture of the support plate.

6. The method of claim 5, including:
laterally retaining the seat portion assembly by coupling the side rail to a clip member of the trim panel.

7. The method of claim 6, including:
linearly retaining the seat portion assembly by receiving the engagement feature in the receiving aperture of the support plate.

8. The method of claim 5, including:
removing the seat portion assembly from the support plate by lifting the seat portion assembly vertically.

9. The method of claim 6, including:
removing the seat portion assembly from the trim panel by lifting the seat portion assembly vertically.

10. The method of claim 5, wherein the step of receiving an engagement feature of the wire frame assembly into a receiving aperture of the support plate further includes:
receiving front and rear engagement features of the wire frame assembly into respective front and rear receiving apertures of the support plate.

11. The method of claim 10, including:
engaging perimeter portions of the front and rear receiving apertures with the front and rear engagement features by moving the wire frame assembly in a car-forward direction.

12. The method of claim 5, wherein the step of overmolding a cushion support assembly to the wire frame assembly further includes:
partially embedding the engagement feature of the wire frame assembly in the cushion support assembly.

13. A method of mounting a seat assembly to a vehicle, comprising:
providing a wire frame assembly having engagement features and first and second side rails;
interconnecting a portion of the wire frame assembly with a cushion support assembly to define a seat portion assembly, wherein the portion of the wire frame assembly is embedded within a body portion of the cushion support assembly, and further wherein the engagement feature and side rail of the wire frame assembly outwardly extend from the cushion support assembly;
mounting first and second trim panels to a seat frame within a vehicle interior;
mounting one or more support plates to the seat frame between the first and second trim panels to define a receiving area therebetween;
coupling the first and second side rails of the wire frame assembly to one or more clip members of the respective first and second trim panels; and
receiving the engagement features of the wire frame assembly into receiving apertures of the one or more support plates.

14. The method of claim 13, wherein the step of coupling the first and second side rails of the wire frame assembly to the one or more clip members of the first and second trim panels further includes:
vertically loading the seat portion assembly into the receiving area.

15. The method of claim 13, wherein the step of receiving the engagement features of the wire frame assembly into receiving apertures of the one or more support plates further includes:
vertically loading the seat portion assembly into the receiving area.

16. The method of claim 13, wherein the step of receiving the engagement features of the wire frame assembly into receiving apertures of the one or more support plate further includes: receiving front and rear engagement features of the wire frame assembly into respective front and rear receiving apertures of the one or more support plates.

17. The method of claim 13, wherein the step of coupling the first and second side rails of the wire frame assembly to one or more clip members of the respective first and second trim panels further includes:
receiving the first and second side rails of the wire frame assembly in upwardly opening clip channels of the one or more clip members of the first and second trim panels.

18. The method of claim 13, including:
laterally retaining the seat portion assembly by coupling the first and second side rails to the first and second trim panels, respectively; and
linearly retaining the seat portion assembly by receiving the engagement features in the receiving apertures of the one or more support plates.

19. The method of claim 13, including:
removing the seat portion assembly from the one or more support plates and the first and second trim panels by lifting the seat portion assembly vertically.

20. The method of claim 13, wherein the step of interconnecting a portion of the wire frame assembly with a cushion support assembly further includes:
overmolding the cushion support assembly to the portion of the wire frame assembly.

* * * * *